March 3, 1953 F. S. STRENG 2,630,226
DIRECT GRAVITY RECOVERY GOLD PAN
Filed Jan. 10, 1951

INVENTOR.
Frank S. Streng
BY Victor J. Evans & Co.
ATTORNEYS

Patented Mar. 3, 1953

2,630,226

UNITED STATES PATENT OFFICE 2,630,226

DIRECT GRAVITY RECOVERY GOLD PAN

Frank S. Streng, Black Hawk, Colo.

Application January 10, 1951, Serial No. 205,316

1 Claim. (Cl. 209—447)

This invention relates to a miner's pan, and more particularly to a pan for use in recovering precious materials, such as gold.

The object of the invention is to provide a pan which is adapted to be used by miners for separating gold from wet sand and the like.

Another object of the invention is to provide a gold miner's pan which can be used for either testing for gold or separating gold from wet sand, the pan enabling the gold to be readily and quickly washed and separated from the sand.

A further object of the invention is to provide a gold prospecting pan which is extremely simple and inexpensive to manufacture.

Other objects and advantages of the invention will be apparent during the course of the following description.

In the accompanying drawings forming a part of this application, and in which like numerals are used to designate like parts throughout the same:

Referring in detail to the drawings, the numeral 10 designates a pan which may be fabricated of any suitable material, such as metal, and the pan 10 includes a bottom wall 11 which may be convex in shape. Extending upwardly from the outer edge of the bottom wall 11 is an annular inclined side wall 12, and the pan 10 is adapted to receive wet sand containing gold or other precious meal.

Figure 2:
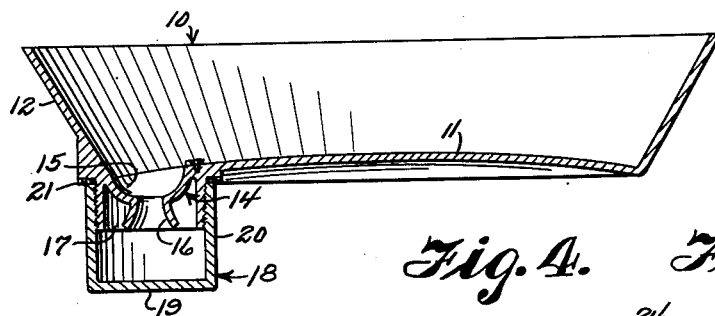
Figure 2 is a sectional view taken on the line 2—2 of Figure 1.

Depending from the bottom wall 11 adjacent the outer edge thereof is a funnel 14, Figure 2, the funnel 14 having its upper end communicating with a suitable opening in the bottom wall 11. Thus, gold will be able to pass from the pan 10 downwardly through the funnel 14. The funnel 14 has its intermediate portion crimped inwardly so as to define an upper chamber 15 and a lower chamber 16.

Arranged in surrounding relation with respect to the funnel 14 and formed integrally with the bottom wall 11 or secured thereto is an annular skirt 17. The skirt 17 is threaded exteriorly for a purpose to be later described.

A cup 18 is provided for at times receiving gold from the pan 10. The cup 18 includes a bottom section 19 and an annular side section 20. The inner surface of the side section 20 is threaded adjacent its upper end so as to engage the annular threaded skirt 17. Thus, the cup 18 can be readily connected to the skirt 17 or detached therefrom. A suitable gasket 21 is interposed between the upper end of the cup 18 and the bottom of the wall 11, so as to effect a fluid-tight seal between these members.

Figure 1:
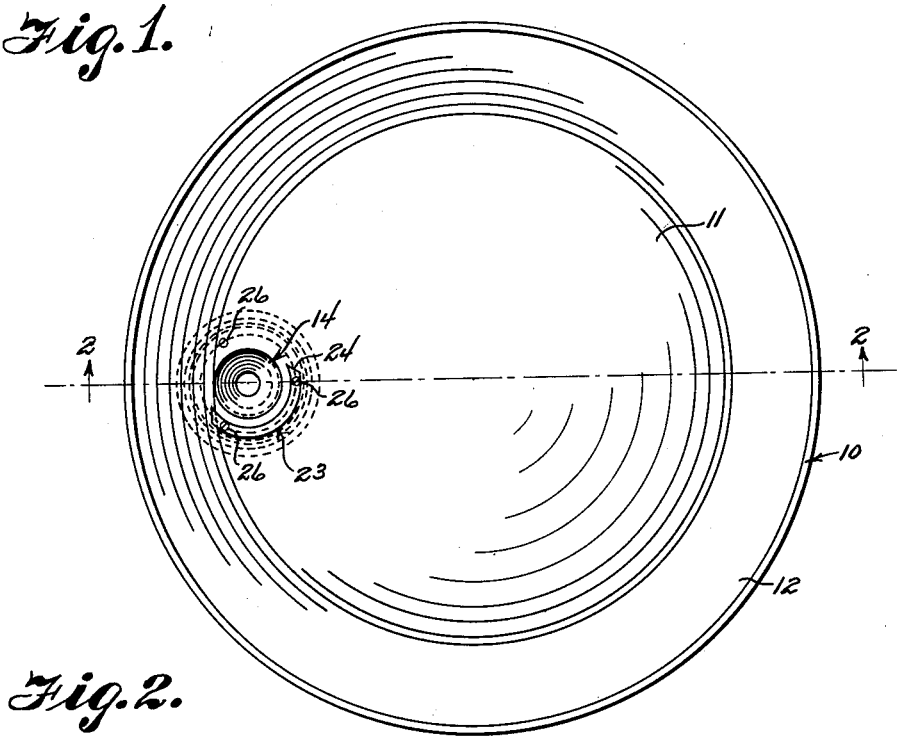
Figure 1 is a top plan view of a gold miner's pan constructed according to the present invention.
Figure 3:
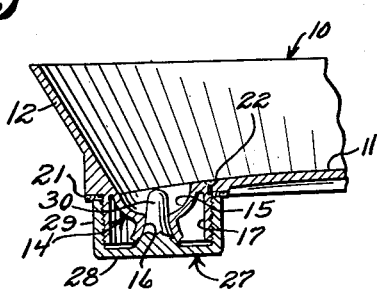
Figure 3 is a fragmentary sectional view of the pan, showing a cap to be used when testing for gold.
Figures 4, 5:
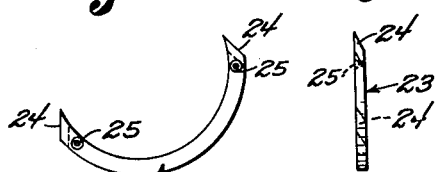
Figure 4 is a detail plan view of the curved baffle member.
Figure 5 is an end elevational view of the baffle member illustrated in Figure 4.

Arranged contiguous to the funnel 14 in the vicinity of the top thereof are three countersunk, threaded holes 22, Figure 3. A curved baffle member 23 is adapted to be detachably connected to the bottom wall 11, Figure 1. The baffle member 23 has its opposite ends beveled or inclined, as at 24, Figure 5, and the baffle member 23 is provided with a pair of countersunk holes 25. Suitable securing elements, such as screws 26, are adapted to be inserted or projected through the holes 25 and into the openings 22 for maintaining the baffle member 23 detachably connected to the bottom wall 11.

The pan of the present invention can be used for testing for gold by detaching the cup 18 and attaching a cap 27 thereto. The cap 27 includes a bottom 28, and an annular side 29 which is adapted to be arranged in threaded engagement with the threaded skirt 17. Extending upwardly from the bottom 28 and secured thereto or formed integrally therewith is a finger or body member 30. The finger 30 is adapted to project upwardly through the funnel 14 so as to prevent the fluid or other material from passing downwardly through the funnel 14.

From the foregoing it is apparent that a pan has been provided which is especially suitable for testing for and recovering gold. By means of the pan of the present invention, the gold can be recovered without the necessity of using mercury. When the cup 18 is connected to the skirt 17, the gold will be collected therein in a concentrated form. The cup 18 can be detached from the skirt 17 after the gold has been collected therein and emptied into a suitable receptacle. By attaching the cap 27 to the skirt 17 in lieu of the cup 18, the pan can be used for testing or panning purposes. The baffle member 23 serves to prevent the gold from working beyond or passing beyond the funnel 14, and the baffle member 23 also prevents the light weight material from entering the funnel 14 from the wrong direction.

With the finger 30 projecting upwardly through the funnel 14, the pan can be used for prospecting or testing gravel. The holes 25 in the baffle member 23 are countersunk or tapered, and also the holes 22 in the bottom of the pan are countersunk. Thus, when the baffle member 23 is not being used, the screws 26 can be inserted in the holes or openings 22 so as to lie flush with the upper surface of the bottom wall 11, whereby foreign matter will be prevented from entering the holes. Both ends of the baffle member 23 are beveled, as at 24, whereby the baffle member 23 can be used interchangeably on opposite sides of the funnel 14, the beveled ends 24 insuring a tight fit between the rim or side wall 12 and the baffle member 23.

When the pan is being used, the material to be worked such as sand, is placed in the pan together with a proper amount of water, and then the pan 10 is shaken or manipulated, whereby the gold moves ahead of the lighter material and along the outer periphery of the bottom wall 11. The gold eventually works its way toward and into the funnel 14, the convex shape of the bottom wall 11 also helping to prevent the lighter material from working into the funnel 14. The gold then passes through the funnel 14, whereby it is collected in the cup 18. The cup 18 and baffle member 23 can be removed from the pan and the cap 27 can be attached when testing for gold. By means of the pan of the present invention the use of mercury is not required, and by first using the cap 27, the raw gravel will be reduced to a concentrated state, and then by removing the cap 27 and substituting the cup 18 and baffle member 23, the gold can be separated from the concentrated gravel or material. Although the bottom wall 11 is shown to be convex, it is to be understood that the bottom wall may be flat.

I claim:

In a miner's pan, a convex bottom wall, an annular inclined side wall projecting upwardly from the outer edge of said bottom wall, a funnel provided with a converging portion depending from the bottom of said bottom wall adjacent its periphery, an exteriorly threaded skirt depending from said bottom wall and surrounding said funnel, a cap having an interior threaded portion engaging said skirt, and a finger projecting upwardly from said cap into the converging portion of the funnel for closing said funnel and a gasket interposed between said cup and bottom wall.

FRANK S. STRENG.

REFERENCES CITED

The following references are of record in the file of this patent:

UNITED STATES PATENTS

| Number | Name | Date |
|---|---|---|
| 37,758 | Kendall | Feb. 24, 1863 |
| 524,586 | Fitch | Aug. 14, 1894 |
| 585,989 | Sletcher | July 6, 1897 |
| 646,382 | Collins | Mar. 27, 1900 |
| 694,255 | Dana | Feb. 25, 1902 |
| 1,194,091 | Stenquist | Aug. 8, 1916 |
| 1,948,797 | Nicolai | Feb. 27, 1934 |